United States Patent [19]

Miyama

[11] Patent Number: 5,267,164
[45] Date of Patent: Nov. 30, 1993

[54] METHOD AND SYSTEM FOR CORRECTING A KNOCK DETECTION PERIOD AND FOR DETECTING KNOCK GENERATED IN AN AUTOMOTIVE ENGINE

[75] Inventor: Shuji Miyama, Musashimurayama, Japan

[73] Assignee: Fuji Jukogyo Kabushiki Kaisha, Tokyo, Japan

[21] Appl. No.: 568,606

[22] Filed: Aug. 16, 1990

[30] Foreign Application Priority Data

Aug. 31, 1989 [JP] Japan ............... 1-225256

[51] Int. Cl.$^5$ .................... F02P 5/14; F02P 11/02
[52] U.S. Cl. ............... 364/431.08; 123/416; 123/625; 364/431.04
[58] Field of Search ............ 364/431.08, 431.01, 364/431.04, 431.07, 431.11; 123/425, 329, 406, 416, 594, 602, 625

[56] References Cited

U.S. PATENT DOCUMENTS 4,711,214 12/1987 Sakakibara et al. ............... 123/425
4,802,454 2/1989 Tanaka ............................. 123/425

FOREIGN PATENT DOCUMENTS 56-2469 1/1981 Japan .

*Primary Examiner*—Jack B. Harvey
*Assistant Examiner*—Edward Pipala
*Attorney, Agent, or Firm*—Martin A. Farber

[57] ABSTRACT

A basic knock detecting period is set based on engine speed and engine load. The basic knock detecting period is corrected with a learning correcting quantity in accordance with engine operating conditions, and a knock detecting period is determined based on the corrected knock detecting period. Knock is detected within the knock detecting period.

7 Claims, 8 Drawing Sheets

METHOD AND SYSTEM FOR CORRECTING A KNOCK DETECTION PERIOD AND FOR DETECTING KNOCK GENERATED IN AN AUTOMOTIVE ENGINE

BACKGROUND OF THE INVENTION

The present invention relates to a method for detecting knock generated in an internal combustion engine such as an automotive engine, and more particularly, to a method for controlling timing and period for detecting the knock.

A learning control system for correcting ignition timing has been proposed. The control system is adapted to advance the ignition timing so as to produce a maximum torque as long as the level of the engine knock does not exceed a tolerable level. If the knock occurs, the control system operates to retard the ignition timing by a predetermined value.

The knock, which occurs during a combustion stroke in a cylinder after ignition, is detected by sensing vibrations of the engine by a knock sensor. However, there are the vibrations generated from sources other than the knock such as a valve seat which generates the vibration when the valve strikes the valve seat. Therefore, the knock must be detected in a period of time between certain crank angles, for example between 30 and 90 degrees after top dead center (ATDC), when the valves do not operate. The knock detecting period is controlled in accordance with engine operating conditions.

Japanese Patent Application Laid-Open 56-2469 discloses a control system of a knock detecting period where a gate signal is provided for taking out a knock signal from various signals. A period generating a gate signal is controlled in accordance with engine speed.

However, since the knock detecting period is determined only in dependency on the engine speed, the system cannot cope with a situation where the ignition timing greatly changes. More particularly, in a learning control system of ignition timing for an engine provided with a supercharger, the ignition timing is controlled in accordance with the engine speed and other conditions such as a change of a octane number of fuel supplied thereto, so that the ignition timing is greatly advanced or retarded. The knock generating timing greatly changes with the ignition timing. Thus, it is difficult to accurately detect the knock in any engine operating condition.

SUMMARY OF THE INVENTION

An object of the present invention is to provide a method for properly detecting knock by controlling the knock detecting period even though ignition timing greatly fluctuates.

Another object of the present invention is to provide a method for detecting the knock generated in an automotive engine having an ignition timing control system for calculating the ignition timing based on a basic ignition timing, and a learning correcting quantity, wherein the knock detecting period is determined at a time immediately after the ignition timing.

According to the present invention, the method comprises detecting engine speed and engine load, setting a basic knock detecting period based on at least one of the engine speed and engine load, correcting the basic knock detecting period with a correcting quantity in accordance with engine operating conditions, determining the knock detecting period based on the corrected knock detecting period, and detecting the knock within the determined knock detecting period.

In an aspect of the invention, the engine load is detected from the pressure in an intake passage of the engine, and the correcting quantity is the learning correcting quantity. The basic knock detecting period is decided by a start time and an end time, and a correction of the basic knock detecting period is performed by adding the correcting quantity to the start time and to the end time.

The other objects and features of this invention will become understood from the following description with reference to the accompanying drawings.

DETAILED DESCRIPTION OF THE PREFERRED EMBODIMENT

Figure 1:
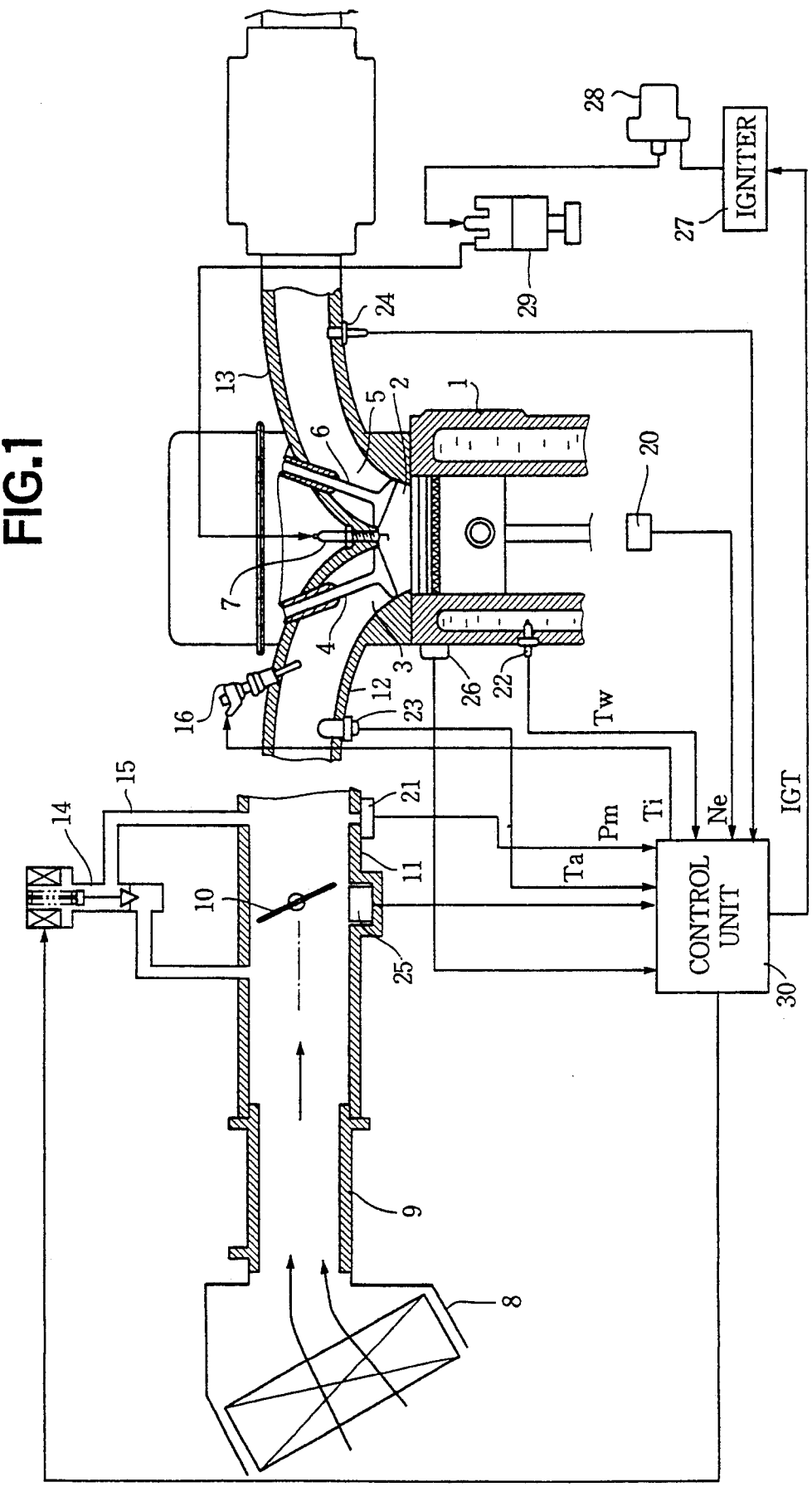
FIG. 1 is a schematic illustration of an engine to which the present invention is applied.

Referring to FIG. 1, an engine 1 has a throttle valve 10 provided in a throttle body 11 communicated with an air cleaner 8 through an intake pipe 9. The throttle body 11 is communicated with an intake manifold 12 which is communicated with a combustion chamber 2 of each cylinder in the engine 1 through an intake port 3 and an intake valve 4. A bypass 15 having an idle speed control (ISC) valve 14 is provided around the throttle valve 10. A spark plug 7 is located in each combustion chamber 2 and a multiple-point fuel injector 16 is provided in the intake manifold 12 adjacent each intake port 3. Exhaust gases of the engine 1 are discharged through an exhaust port 5, an exhaust valve 6 and an exhaust manifold 13. The engine 1 is provided with a crank angle sensor 20, a pressure sensor 21 for detecting pressure in the intake pipe 11 downstream of the throttle valve 10, a coolant temperature sensor 22, an intake air temperature sensor 23, an $O_2$-sensor 24 for detecting oxygen concentration of the exhaust gases in the exhaust manifold 13, a throttle position sensor 25 and a knock sensor 26. Output signals of the sensors 20 to 26 are applied to a control unit 30 which applies a fuel injection signal to the injector 16, an idle signal to the ISC valve 14 and an ignition signal to the spark plug 7 through an igniter 27, an ignition coil 28 and a distributor 29. Engine speed Ne is calculated based on a crank angle signal from the crank angle sensor 20 and intake pressure Pm is calculated based on a signal from the pressure sensor 21, which are used for calculating a basic injection pulse width Tp. The basic injection pulse width Tp is corrected in accordance with coolant temperature Tw from the coolant temperature sensor 22, intake air temperature Ta from the intake air temperature sensor 23 and a feedback signal from the $O_2$-sensor 24. The fuel injector 16 injects an amount of fuel which corresponds to a corrected injection pulse width Ti.

On the other hand, it is determined that the engine 1 is idling in accordance with a throttle opening degree detected by the throttle position sensor 25, or with an ON-signal of an idle switch. The opening degree of the ISC valve 14 is adjusted to control the engine idling speed.

Figure 2:
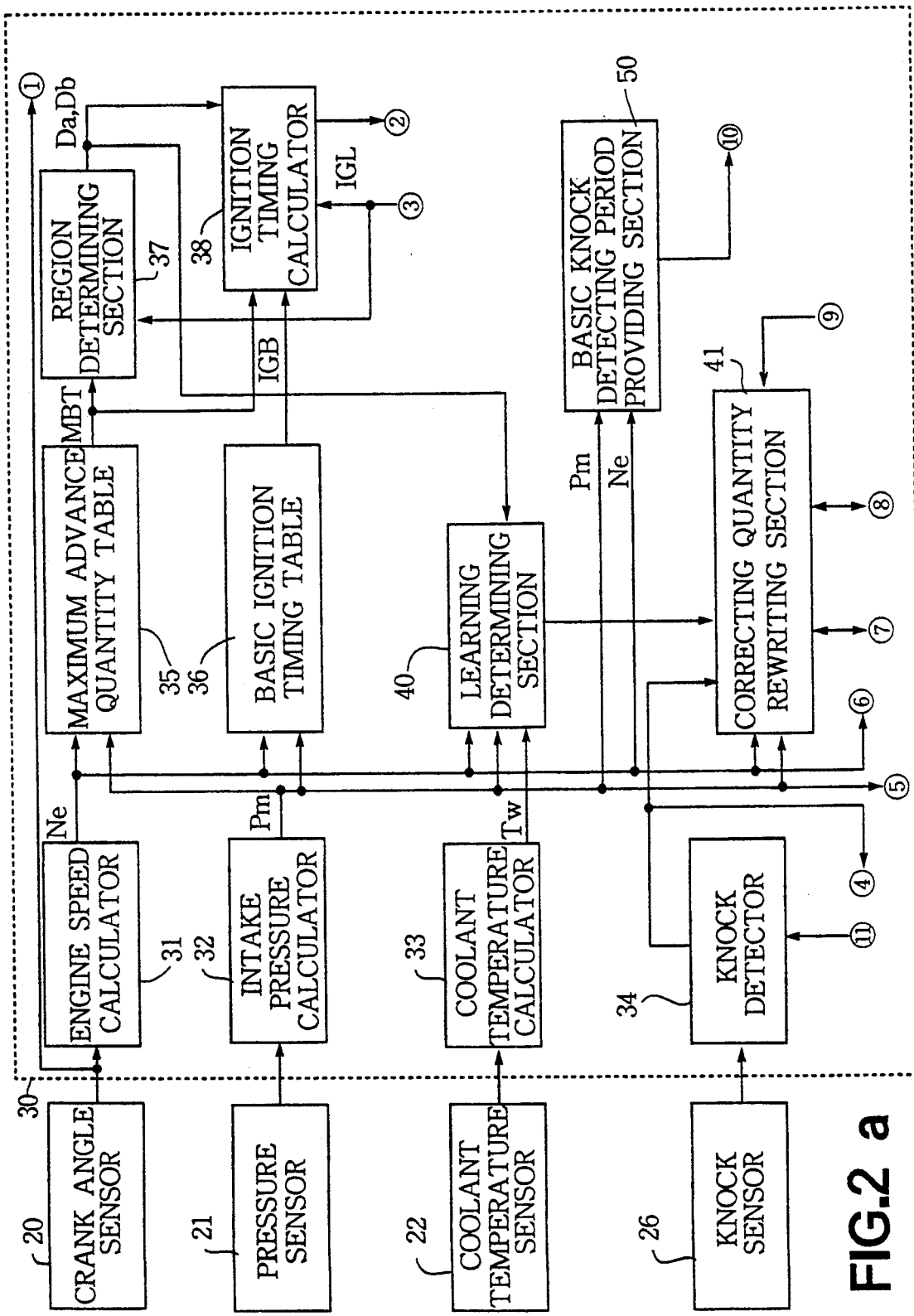
FIGS. 2a to 2c together show a block diagram of a control system according to the present invention.
Figure 2:
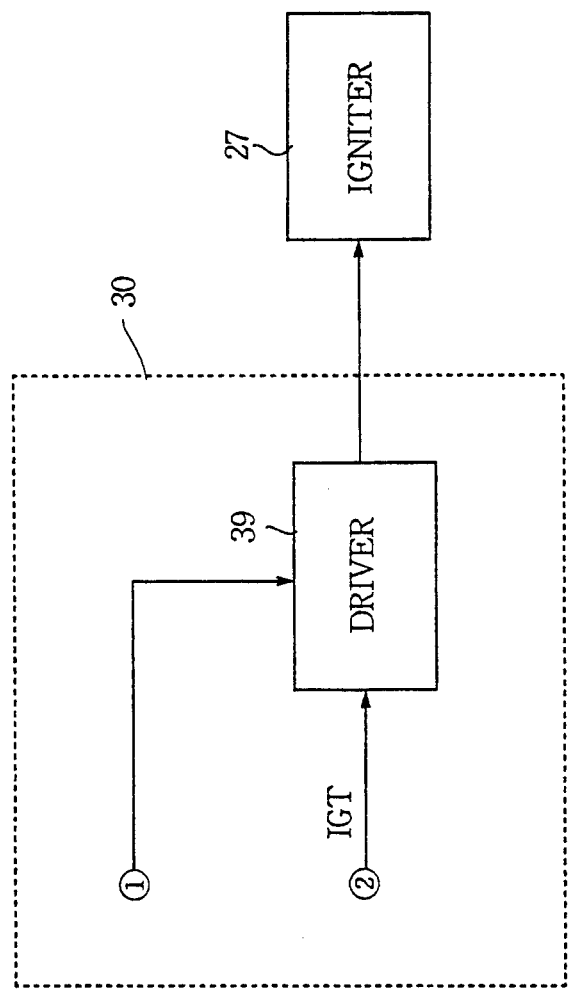
Figure 2:
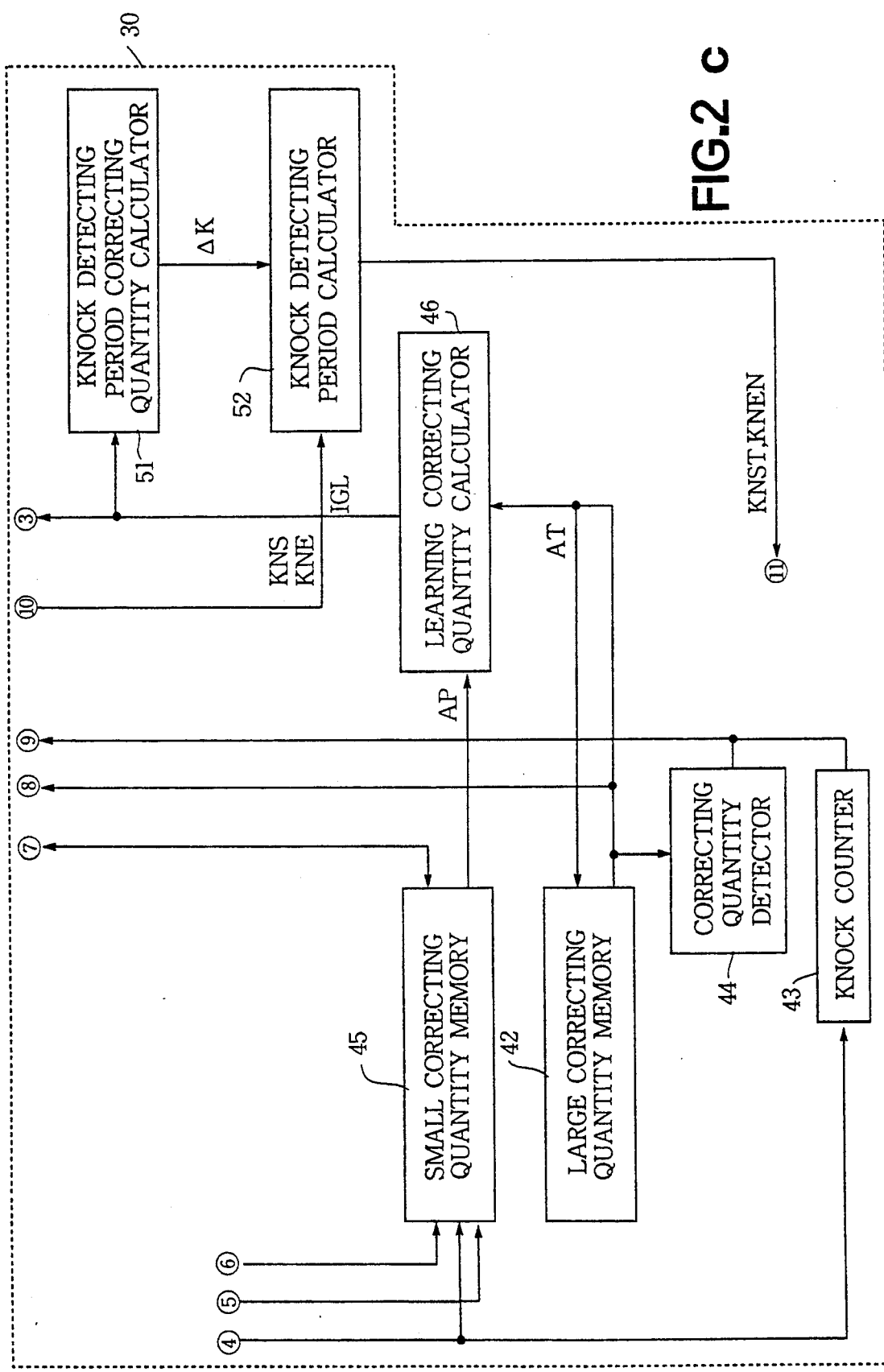

Referring to FIGS. 2a and 2c, the control unit 30 has an engine speed calculator 31, an intake pressure calculator 32 and a coolant temperature calculator 33 for calculating the engine speed Ne, the intake pressure Pm and the coolant temperature Tw based on the crank angle signal from the crank angle sensor 20, the pressure sensor 21 and the coolant temperature sensor 22, respectively. A knock detector 34 is provided to produce a knock signal when the knock sensor 26 detects knocking of the engine.

Figure 6:
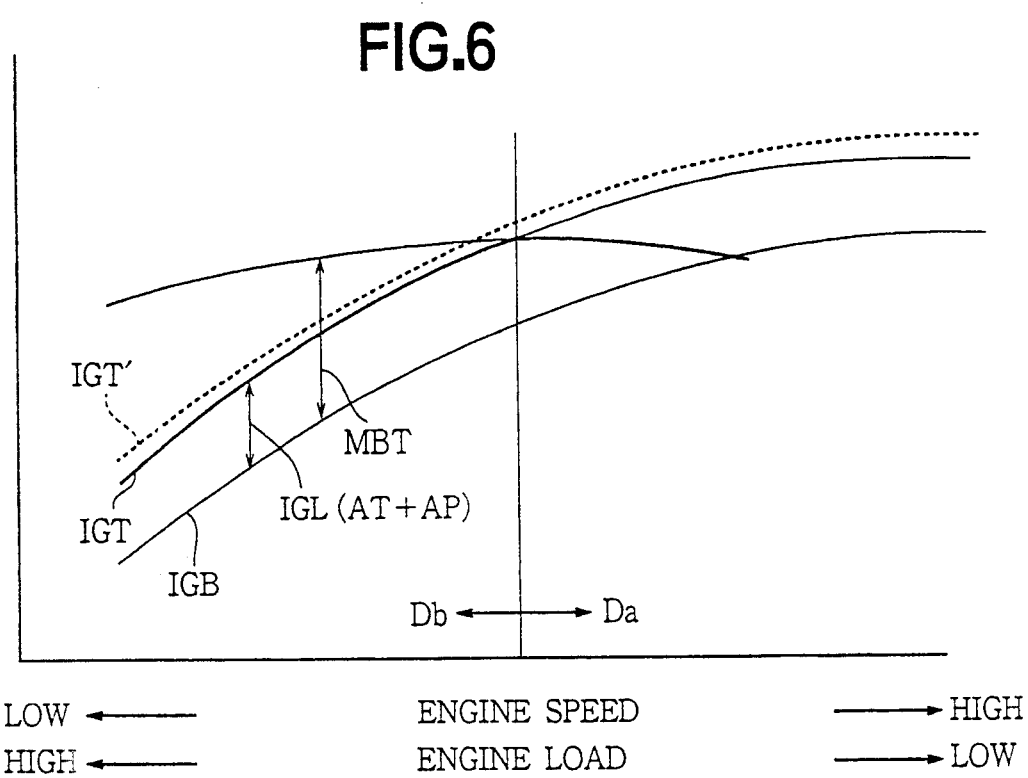
FIG. 6 is a graph showing characteristics of ignition timing and advance quantity in accordance with engine speed and engine load.

The engine speed Ne and the intake pressure Pm are fed to a basic ignition timing look-up table 36 and a maximum advance quantity look-up table 35. The basic ignition timing table 36 stores a plurality of basic ignition timings IGB, arranged in accordance with the engine speed Ne and the intake air pressure Pm. The basic ignition timing IGB is a maximum timing for producing maximum torque with low-octane gasoline without causing the knocking. The basic timing IGB advances with an increase of the engine speed Ne and an increase of the engine load represented by the intake air pressure Pm as shown in FIG. 6. The maximum advance quantity table 35 stores a plurality of maximum advance quantities MBT, arranged in accordance with the engine speed Ne and the intake pressure Pm. The maximum advance quantity MBT is a value to be added to the basic ignition timing IGB to obtain a maximum torque with high-octane gasoline without causing the knocking. A theoretically desired maximum ignition timing IGT' for obtaining the maximum torque is shifted in parallel in the advancing direction with an increase in the octane number of the fuel.

The maximum advance quantity MBT and a learning correcting quantity IGL obtained through a learning procedure, an operation which will be later described, are fed to a region determining section 37. In the determining section 37, the maximum advance quantity MBT and the learning correcting quantity IGL are compared with one another to select one of regions Da and Db shown in FIG. 6. When the maximum advance quantity MBT is smaller than the correcting quantity IGL (MBT≦IGL), the region Da is selected, where the maximum advance quantity MBT is used for obtaining an ignition timing IGT. To the contrary, when the maximum advance quantity MBT is larger than the learning correcting quantity IGL (MBT>IGL), the region Db is selected, where the correcting quantity IGL is derived.

The output signal of the region determining section 37, the maximum advance quantity MBT, the basic ignition timing IGB and the learning correcting quantity IGL are fed to an ignition timing calculator 38. When the region Db is selected, the learning correcting quantity IGL is derived to advance the basic ignition timing IGB. The ignition timing IGT is calculated as follows.

IGT=IGB+IGL

On the other hand, in the region Da, the basic ignition timing IGB is advanced by the maximum advance quantity MBT so that the ignition timing IGT is calculated as follows.

IGT=IGB+MBT

The ignition timing IGT is applied to the igniter 27 through a driver 39 so as to ignite the spark plug at the calculated timing IGT in accordance with the crank angle signal.

The control unit 30 further has a system for obtaining the learning correcting quantity IGL through learning. A learning determining section 40 is applied with the output signal of the region determining section 37, the engine speed Ne, the intake pressure Pm and the coolant temperature Tw to determine whether the engine operating conditions are proper for performing the learning operation. The learning operation is executed when the vehicle is driven in a warmed up state, and in a high engine load range and a low engine speed range where the knocking can be accurately detected, and when the Db range is selected. The output signal of the determining section 40 is applied to an ignition timing correcting quantity rewriting section 41 to which the engine speed Ne, the intake pressure Pm and the knock signal are further fed. The correcting quantity rewriting section 41 selectively performs an entire rough correcting operation with a large learning correcting quantity AT and an individual fine correcting operation with a small correcting quantity in accordance with the engine operating conditions. The large learning correcting quantity AT stored in a large correcting quantity memory 42 is rewritten dependent on the knock signal from the knock detector 34 so that the real ignition timing IGT approximates the desired maximum timing IGT' dependent on the octane number of the fuel. When the knocking does not occur, the learning operation is performed once every predetermined period t1, for example, 1 second, to increase the large learning correcting quantity AT by a predetermined value a, thereby changing the large learning correcting quantity AT in the advance direction. On the other hand the correcting quantity AT is decreased by a predetermined value γ at every time when the knocking occurs. A knock counter 43 is fed with the knock signal to count occurrences of the knocking. When the counter 43 counts up the knocking to a predetermined number a, for example 5 times, the knock counter 43 produces an output signal which is applied to the correcting quantity rewriting section 41. A correcting quantity detector 44 is fed with the correcting quantity AT derived from the memory 42 to compare the quantity with a predetermined maximum advance quantity AM. When the correcting quantity AT reaches the maximum advance quantity AM, a signal is fed to the rewriting section 41. The rewriting section 41 stops the rough correction when either of the signals from the counter 43 or the detector 44 is fed, estimating that the ignition timing has approached the desired maximum timing IGT'.

A fine correcting operation is carried out thereafter. A small learning correcting quantity AP is read out from a small correcting quantity memory 45 storing a plurality of small learning correcting quantities AP which are arranged in accordance with the engine operating conditions. A designated small learning correcting quantity AP is similarly increased or decreased by learning in the rewriting section 41 in dependency on the occurrence of the knocking. Thus, the ignition timing IGT is further advanced to approach the desired maximum timing IGT'.

The large learning correcting quantity AT and the small learning correcting quantity AP are fed to a learning correcting quantity calculator 46 where the learning correcting quantity IGL is calculated as follows.

$$IGL = AT + AP$$

The learning correcting quantity IGL is fed to the ignition timing calculator 38 as described hereinbefore.

The control unit 30 of the present invention is provided with a system for determining a period in which the knock is to be detected. The principle of the system is described. The period for detecting the knock can be determined based on the ignition timing. Thus, one of the basic knock detecting periods corresponding to the basic ignition timing IGB is determined in dependency on the engine speed Ne and the intake pressure Pm. When the ignition timing changes in accordance with the learning correcting quantity IGL, one of the knock detecting periods correcting quantity corresponding to the learning correcting quantity IGL is obtained, thereby correcting the basic knock detecting period within a minimum necessary range.

More particularly, the control system 30 has a basic knock detecting period providing section 50 to which the engine speed Ne and the intake pressure Pm are fed. The basic knock detecting period providing section 50 has a look-up table storing a plurality of a basic knock detecting period start time KNS and a look-up table storing a plurality of basic knock detecting period end times KNE, each arranged in accordance with the engine speed Ne and the intake pressure Pm. The basic start times KNS are set at predetermined timings immediately after the basic ignition timing. The control unit 30 has a knock detecting period correcting quantity table 51 storing a plurality of knock detecting period correcting quantities ΔK arranged in accordance with the learning correcting quantity IGL as an increasing function thereof. The basic start timing KNS, the basic end time KNE and the correcting quantity ΔK, each retrieved from the respective tables, are fed to a knock detecting period calculator 52 where a knock detecting period start time KNST and a knock detecting period end time KNEN are calculated as follows.

$$KNST = KNS + \Delta K$$

$$KNEN = KNE + \Delta K$$

The start time KNST and the end time KNEN are applied to the knock detector 34.

Figure 3:
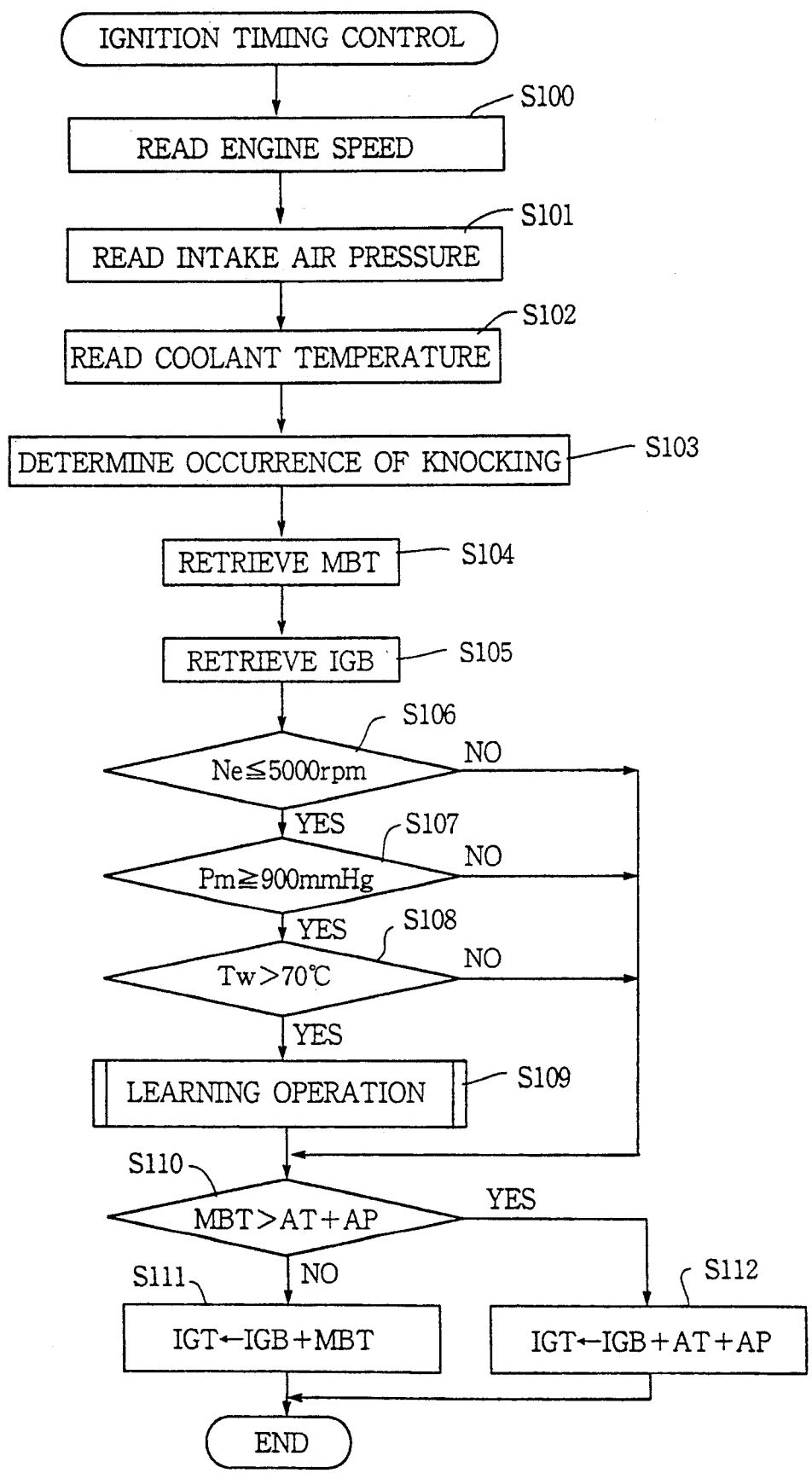
FIGS. 3, 4, and 5 are flowcharts showing an operation of the system.
Figure 4:
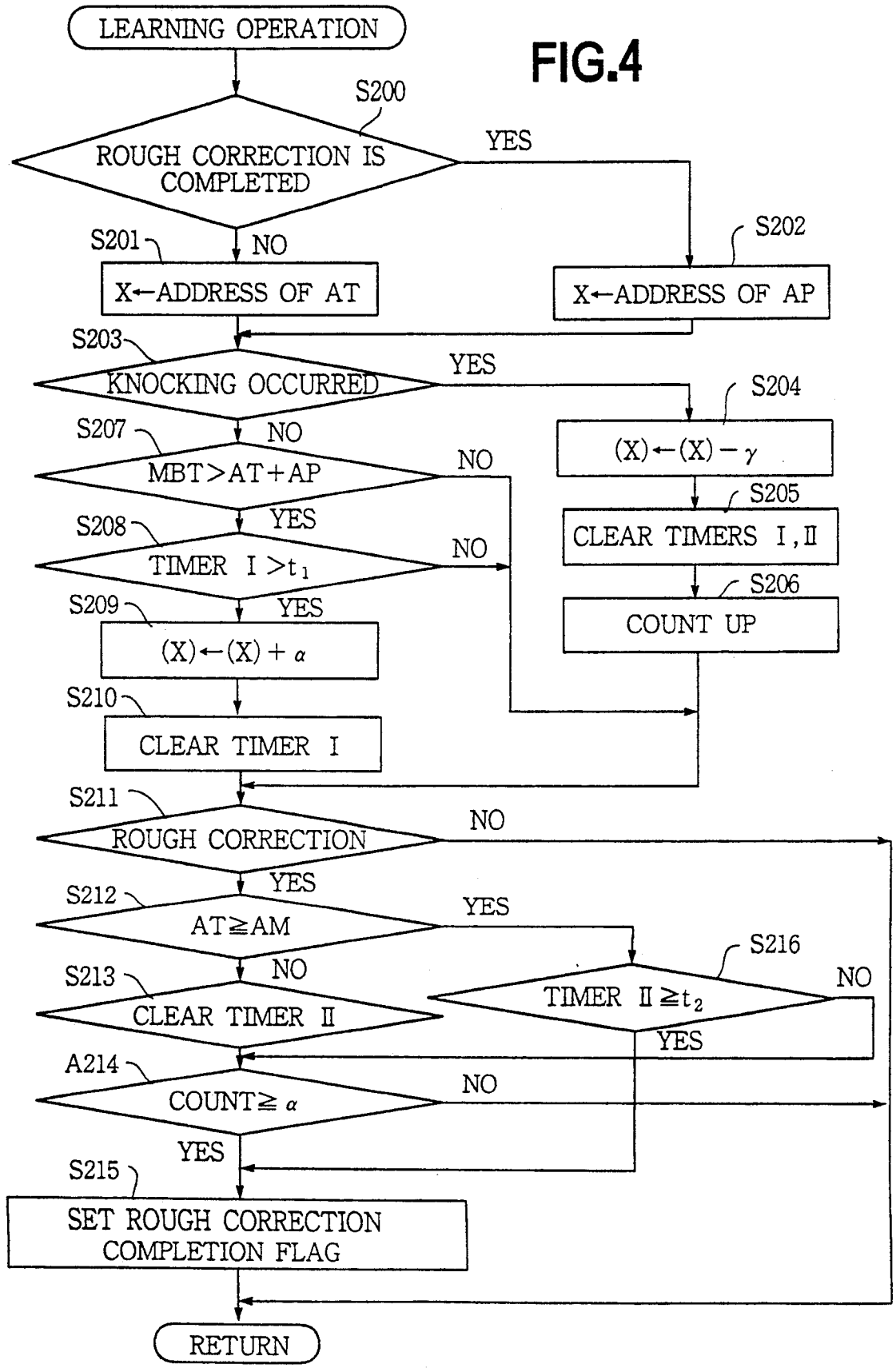

FIGS. 3 shows the operation of the system in summary. When the program starts, the engine speed Ne, the intake air pressure Pm and the coolant temperature Tw are read out at stops S100 to S102. At a step S103, an occurrence of knocking is detected. Thereafter, at steps S104 and S105, the maximum advance quantity MBT and the basic ignition timing IGB are read out from the respective tables 35 and 36 in accordance with the engine speed Ne and the intake air pressure Pm. Steps S106 to S108 determine whether conditions for the learning are satisfied. More particularly, improper conditions for learning, such as cold engine states, or a high engine speed range where the knock signal may contain noise or a low engine load range where the output of the sensors are low, are omitted at the steps S106 to S108. That is, it is determined whether the engine speed Ne is smaller than 5000 rpm (Ne≦5000 rpm), the intake pressure Pm is higher than 900 mmHg (Pm≧900 mmHg) and whether the coolant temperature Tw is higher than 70° C. (Tw>70° C.). When all of the answers at the steps S106 to S108 are YES, the program goes to a step S109 for the learning operation which is described in FIG. 4.

A step S200 determines whether the entire rough learning correction is completed. When the rough learning correction is not completed, an address of the large learning correcting quantity AT in the memory 42 is stored in an index register X at a step S201. The program proceeds to a step S203 where it is determined whether a knock has occurred during the program. When the occurrence of the knock is determined, the program proceeds to a step S204, and if not, proceeds to a step S207. At the step S204, all of the large learning correcting quantities AT are decremented by a correcting quantity γ. Timers I and II are cleared at a step S205 and the counter 43 counts up the occurrence of the knocking at a step S206.

On the other hand, at the step S207, the maximum advance quantity MBT is compared with the corresponding learning correcting quantity IGL (AT+AP). When the maximum advance quantity MBT is smaller than the correcting quantity IGL, the learning operation is terminated, since the correcting quantity IGL exceeds the (limit) maximum advance quantity MBT. At a step S208, the timer I for measuring the period during which knocking does not occur is checked to determine whether the engine 1 has operated without causing the knocking for the predetermined period t1 (for example 1 second). If the present time is within the period t1, the learning is not executed. When the knocking has not occurred for the period t1, the correcting quantity AT is incremented by the quantity a at a step S209, and the timer I is cleared at a step S210.

The following steps S211 to S215 are provided for determining completion of the rough learning correction. At a step S211, it is determined whether the rough correction is still being carried out. When the corresponding correcting quantity AT is smaller than the predetermined maximum advance quantity AM (step S212), the timer II is cleared at a step S213. At a step S214, it is determined that the rough correction is completed when the knocking has occurred more than the predetermined number (for example 5 times) so that a rough correcting completion flag is set at a step S215.

When the large learning correcting quantity AT reaches the predetermined maximum quantity AM (step S212), it is determined at a step S216 whether a predetermined period t2, for example 3 seconds, has passed since the start of the rough correction. The program is repeated to continue the rough correction for the predetermined period. When the period has passed, the program proceeds to the step S215.

When the rough learning correcting operation is completed, the program goes to a step S202 from the step S200 where an address of the small correcting quantity AP is stored in the index register X. Thereafter, steps similar to the steps S203 to S210 are carried out. Namely, when one knocking occurs, one of the corresponding small learning correcting quantities AP is decreased by the predetermined correcting quantity γ. To the contrary, when the knocking does not occur, the small correcting quantity AP is increased once at every period t1 to advance the timing. When it is determined at the step S211 that the fine correction is being carried out, the program is repeated except when performing the rough learning correction.

During the fine correction, the program shown in FIGS. 3a and 3b proceeds to a step S110 where it is determined whether the maximum advance quantity MBT is larger than the sum of the correcting quantity IGL, which is the sum of the large correcting quantity AT and the small correcting quantity AP. When the MBT is smaller than IGL (MBT≦IGL), the program goes to a step S111 to calculate the ignition timing IGT by advancing the basic injection timing IGB with the maximum advance quantity MBT. To the contrary, if the MBT is larger than the IGL (MBT>IGL), the ignition timing IGT is determined by advancing the basic timing IGB with the correcting quantity IGL at a step S112. Thus, the ignition timing IGT close to the desired maximum timing IGT' can be obtained as shown by a bold line in FIG. 6.

Figure 5:
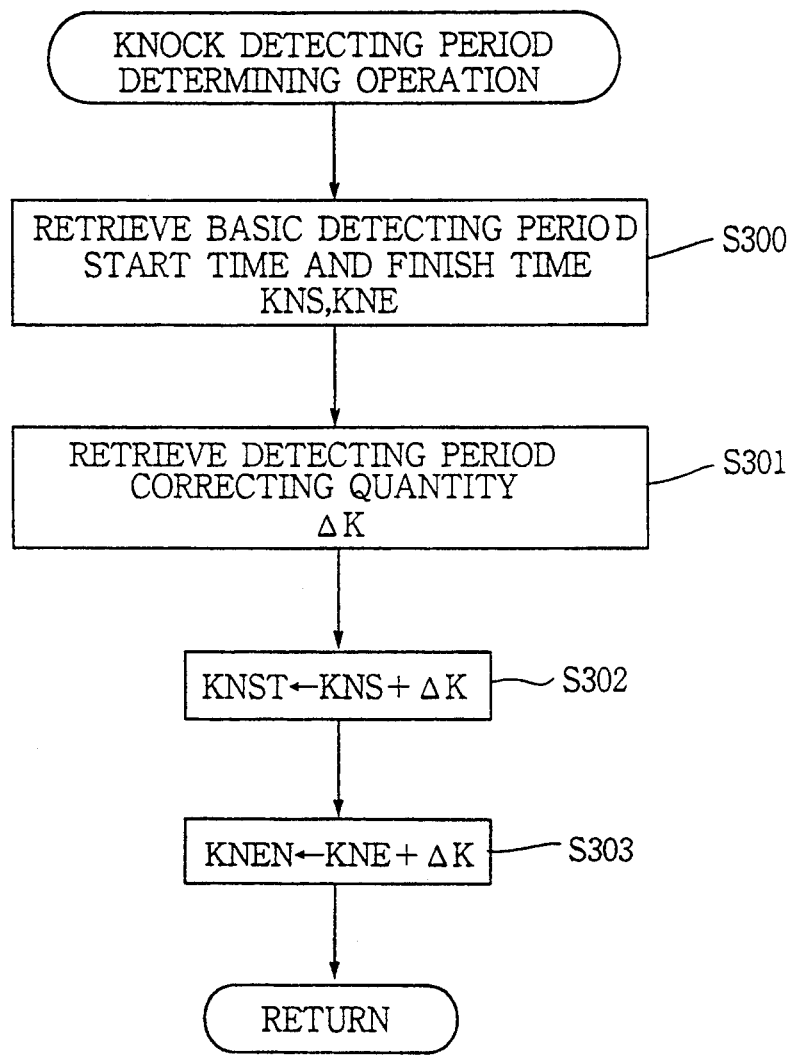

The operation for determining the knock detecting period is described hereinafter with reference to the flowchart shown in FIG. 5. At a step S300, the basic knock detecting period start time KNS and the basic knock detecting period end time KNE are retrieved from the look-up tables in accordance with the engine speed Ne and the intake pressure Pm in the basic knock detecting period providing section 50. At a step S301, the knock detecting period correcting quantity ΔK is retrieved from the knock detecting period correcting quantity table 51 in accordance with the ignition timing learning correcting quantity IGL. Thereafter, the correcting quantity ΔK is added to the basic start time KNS and the basic end time KNE of the knocking detecting period at steps S302 and S303, respectively. When the ignition timing correcting quantity IGL is zero, a knock detecting period Tk is between the basic detecting period start time KNS immediately after the basic ignition timing, and the basic detecting end time KNE.

Figure 7:
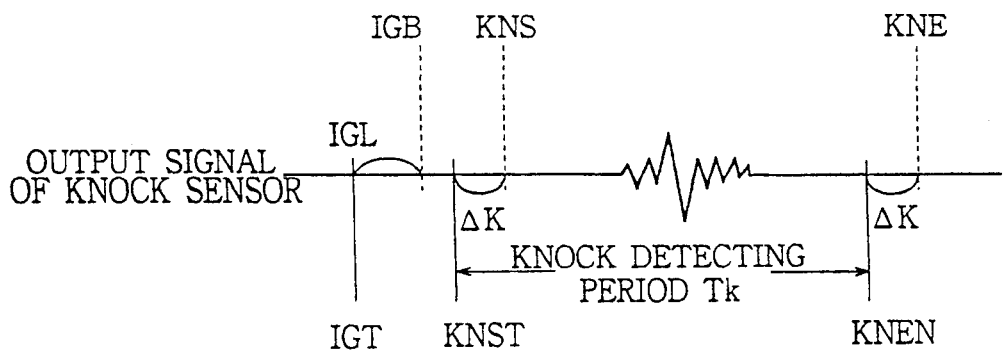
FIG. 7 is a time chart explaining an operation of the present invention.

On the other hand, when the maximum advance quantity MBT changes due to the change in the octane of the fuel, the ignition timing IGT is greatly advanced or retarded by the learning correcting quantity IGL. The knock detecting period corresponding quantity ΔK correcting to the correcting quantity IGL is added to the basic start time KNS and the basic end time KNE, respectively, to obtain the start time KNST and the end time KNEN. Thus, the knock detecting period Tk is advanced or retarded- in accordance with the advance or the retardation of the ignition timing IGT as shown in FIG. 7. Accordingly, the knock detecting period always starts immediately after the ignition.

The knock detecting period Tk is fed to the knock detector 34 where the knock signal is produced in dependency on the output signal of the knock sensor only during the period Tk. Therefore, the knock is detected at the combustion time without being affected by the vibration caused by the valves of the engine and ignition noises.

The present invention may be modified to use intake air quantity or throttle valve opening degree as the engine load instead of the intake pressure.

From the foregoing, it will be understood that the present invention provides a method where a detecting period of knock is calculated based on a basic knock detecting period and a detecting period correcting quantity which is dependent on an ignition timing learning correcting quantity. Thus, the detecting period is set immediately after the ignition within a minimum necessary range, thereby accurately detecting the knock without erroneously determining a signal due to a noise,. as a knock signal. When the ignition timing is greatly advanced or retarded, the knock detecting period is corrected accordingly, so that the knock can be reliably detected. In addition, since the beginning and the end of the detecting period are determined, the optimum timing and the length of the period are determined.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method for detecting knock generated in an automotive engine having valves and an ignition timing control system to calculate changing ignition timing based on a basic ignition timing and an ignition timing learning correcting quantity in dependency on operating conditions of the engine, the knock occurring during a combustion time of the engine after the ignition timing, the method comprising the steps of:

detecting engine speed and engine load;

setting a basic knock detecting period to occur at a time immediately after the basic ignition timing based on at least one of the engine speed and the engine load;

correcting said basic knock detecting period with a knock detecting period correcting quantity corresponding to the ignition timing learning correcting quantity and providing a corrected knock detecting period to occur at a time immediately after the changing ignition timing during which corrected knock detecting period there is absence of vibration caused by the valves of the engine and of ignition noises;

detecting knock only within the corrected knock detecting period so as to accurately detect the knock without erroneously picking up noises.

2. The method according to claim 1, wherein said engine load is detected from a pressure in an intake passage of the engine.

3. The method according to claim 1, wherein said basic knock detecting period is decided by a start time and an end time, and said correction of the basic knock detecting period is performed by adding said knock detecting period correcting quantity to said start time and to said end time.

4. A system according to claim 1, wherein the ignition timing is advanced or retarded and the knock detecting period is also advanced or retarded respectively in accordance with the engine operating conditions.

5. A system for detecting knock generated in an automotive engine having valves and an ignition timing control system to calculate changing ignition timing based on a basic ignition timing and an ignition timing learning correcting quantity in dependency on operating conditions of the engine, the knock occurring during a combustion time of the engine after the ignition timing, the system comprising:

detector means for detecting engine speed and engine load;

setting means for setting a basic knock detecting period to occur at a time immediately after the basic ignition timing based on at least one of the engine speed and the engine load;

correcting means for correcting said basic knock detecting period with a knock detecting period correcting quantity corresponding to the ignition timing learning correcting quantity and providing a corrected knock detecting period to occur at a time immediately after the changing ignition timing during which corrected knock detecting period there is absence of vibration caused by the valves of the engine and of ignition noises;

means for detecting knock only within the corrected knock detecting period so as to accurately detect the knock without erroneously picking up noises.

6. A method for detecting knocking phenomenon in an automotive engine mounted on a motor vehicle having a knock sensor provided on a cylinder wall of said engine for sensing vibration waveforms and for converting said waveforms into an electrical signal, a crank angle sensor for detecting a crank angle of a crankshaft in said engine and for generating an engine speed signal, a pressure sensor connected to an intake pipe of the engine for sensing intake air pressure and for producing a pressure signal, ignition timing control means responsive to said electrical, said pressure and said engine speed signals for calculating an ignition timing, and learning control means responsive to said electrical, said pressure and said engine speed signals for correcting said ignition timing through a learning control in dependency on operating conditions of said engine for producing an ignition timing learning control correcting quantity signal, the method comprising the steps of:

deriving a basic knock detecting period from stored data based on at least one of said engine speed signal and said pressure signal;

providing a knock detecting period correcting quantity corresponding to said ignition timing learning control correcting quantity signal;

correcting said basic knock detecting period with said knock detecting period correcting quantity to provide a corrected knock detecting period; and detecting knock within the corrected knock detecting period, so as to accurately detect said knock without erroneously picking up noises.

7. A detecting system for a knocking phenomenon in an automotive engine mounted on a motor vehicle having a knock sensor provided on a cylinder wall of said engine for sensing vibration waveforms and for converting said waveforms into an electrical signal, a crank angle sensor for detecting a crank angle of a crankshaft in said engine and for generating an engine speed signal, a pressure sensor connected to an intake pipe of the engine for sensing intake air pressure and for producing a pressure signal, ignition timing control means responsive to said electrical, said pressure and said engine speed signals for calculating an ignition timing, and learning control means responsive to said electrical, said pressure and said engine speed signals for correcting said ignition timing through a learning control in dependency on operating conditions of said engine for producing an ignition timing learning control correcting quantity signal, the system further comprising deriving means responsive to at least one of said engine speed signal and said pressure signal for retrieving a basic knock detecting period from stored data and for generating a basic period signal;

means responsive to said ignition timing learning control correcting quantity signal for providing a knock detecting period correcting quantity corresponding to said ignition timing learning control correcting quantity signal and for producing a knock detecting period correcting quantity signal;

correcting means responsive to said basic period signal and said knock detecting period correcting quantity signal for correcting said basic knock detecting period to provide a corrected knock detecting period; and means for detecting knock within the corrected knock detecting period, so as to accurately detect said knock without erroneously picking up noises.

* * * * *